Nov. 7, 1967 J. R. BERRY 3,350,769
IRRIGATION PIPE MOVING APPARATUS AND METHOD
Filed Dec. 23, 1964 4 Sheets-Sheet 1

JOHNNIE R. BERRY
INVENTOR.

BY:

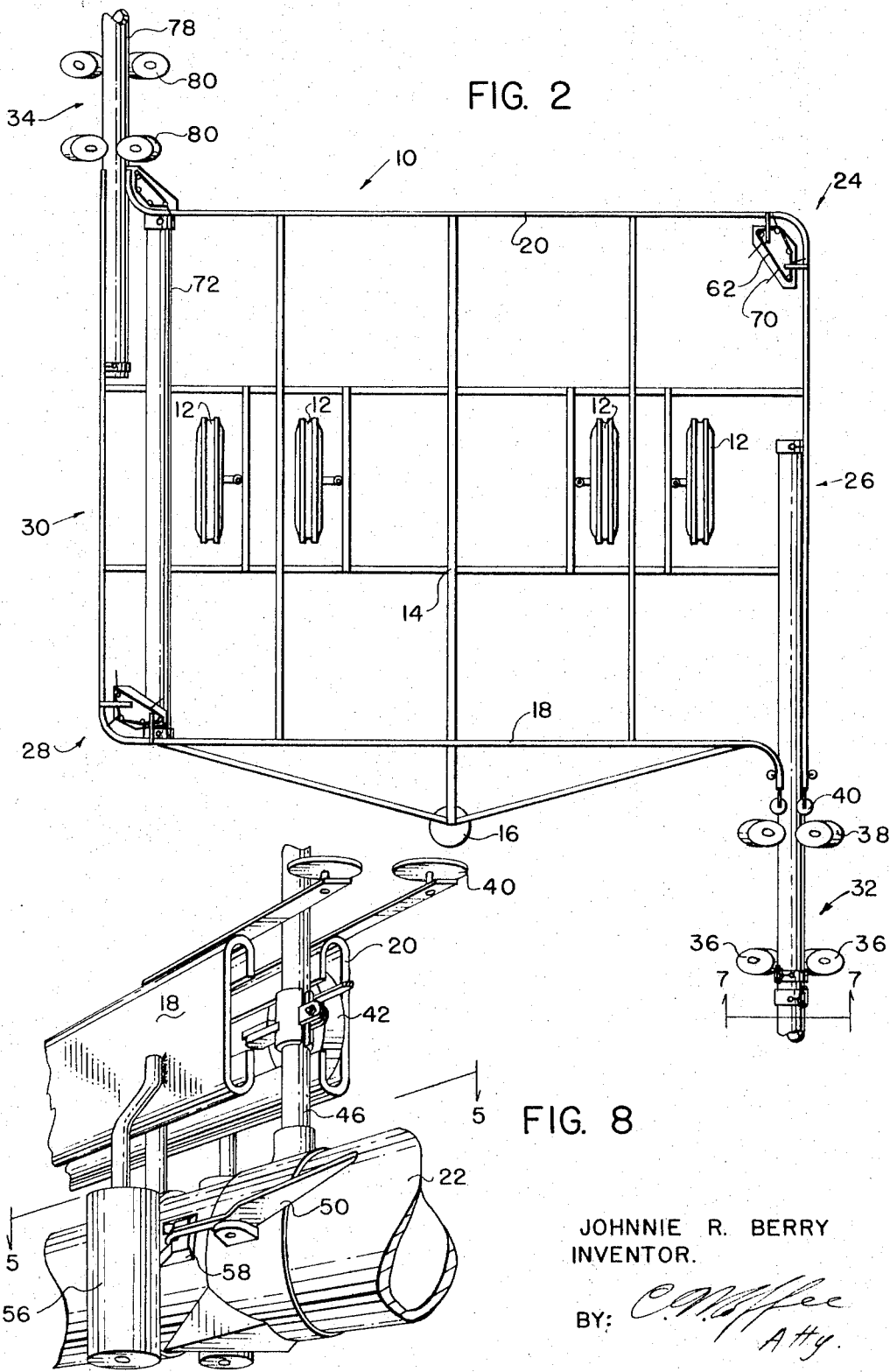

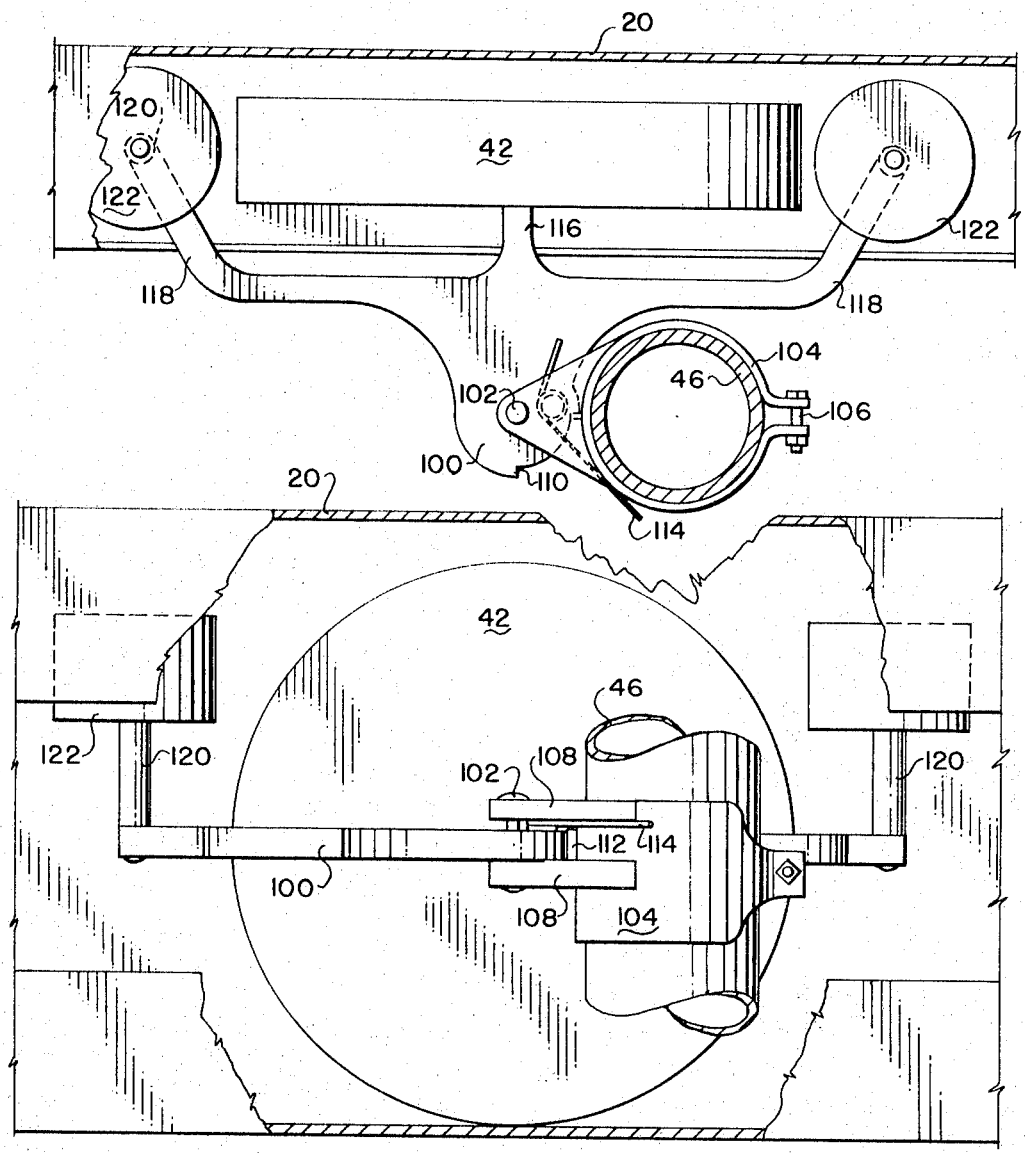

Nov. 7, 1967  J. R. BERRY  3,350,769
IRRIGATION PIPE MOVING APPARATUS AND METHOD
Filed Dec. 23, 1964  4 Sheets-Sheet 4
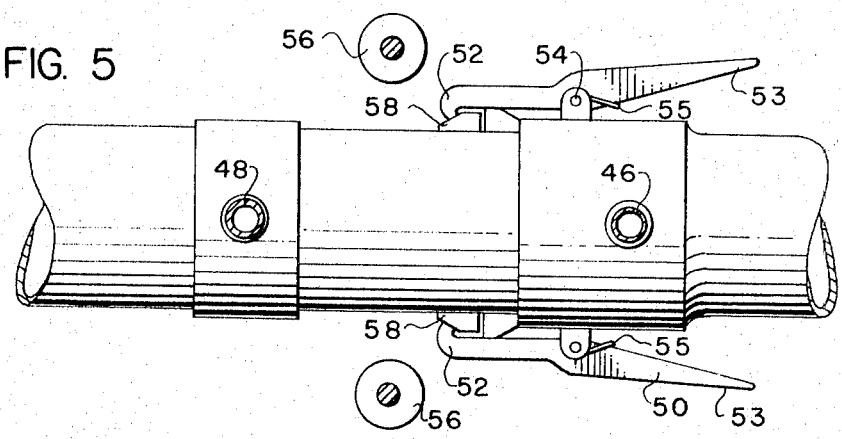
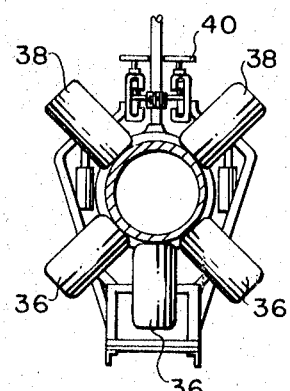
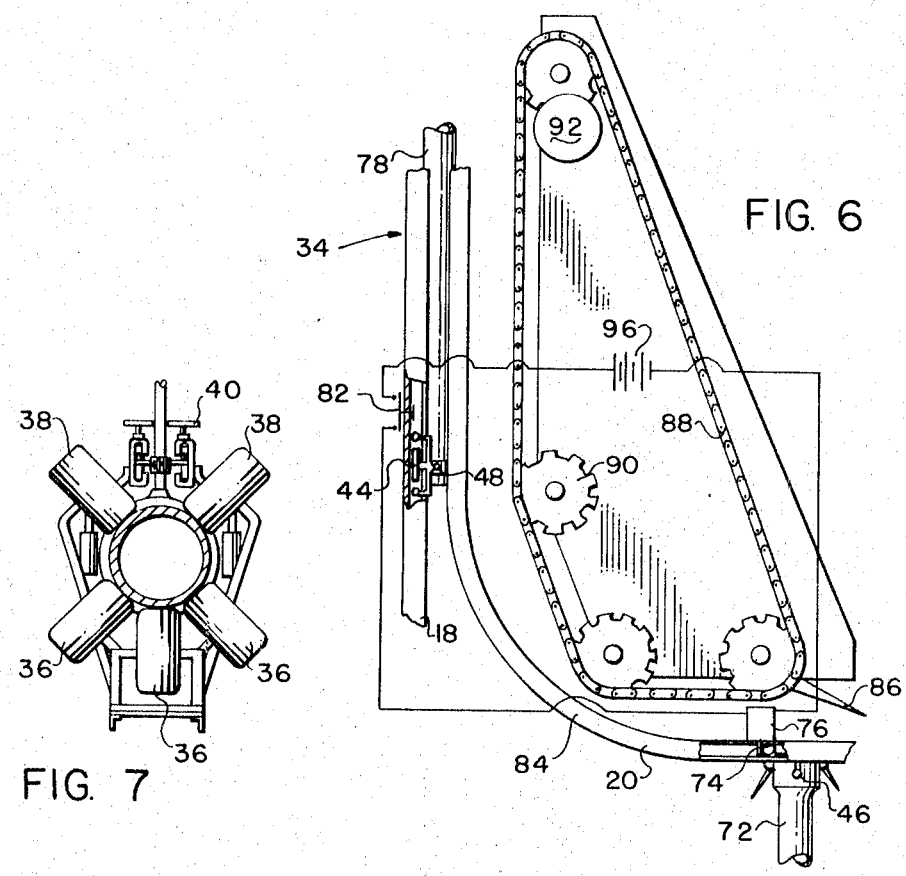
JOHNNIE R. BERRY
INVENTOR.

3,350,769
IRRIGATION PIPE MOVING APPARATUS
AND METHOD
Johnnie R. Berry, 3414 59th St.,
Lubbock, Tex. 79413
Filed Dec. 23, 1964, Ser. No. 420,509
11 Claims. (Cl. 29—431)

This invention relates to agricultural irrigation and more particularly to an apparatus and method for moving irrigation sprinkler pipe from one land to another in a field.

In modern farming practices today much of the land is irrigated by sprinkling. In commercial practice the sprinklers are mounted on joints of pipe which are latched or coupled together to form lines. After one land has been watered it is necessary to move the sprinklers to an adjacent land to irrigate it.

An object of this invention is to provide an apparatus and method for moving agricultural sprinkler pipe from one position to a second parallel position.

Another object of this invention is to provide a vehicle for picking up the pipe from a first position and loading it onto the vehicle.

Another object is to provide a vehicle which when loaded with pipe can discharge it in any given location coupled together in a line.

A further object of this invention is to provide a special joint for agricultural pipe lines particularly adapted for mechanized coupling, uncoupling, and moving.

Still further objects are to achieve the above with an apparatus that is sturdy, compact, durable, simple, versatile and reliable, yet inexpensive and easy to manufacture and operate.

Still further objects are to achieve the above with a method that is rapid, inexpensive, and does not require skilled people to operate.

The specific nature of the invention as well as other objects, uses, and advantages thereof will clearly appear from the following description and from the accompanying drawing, the different views of which are not necessarily to the same scale in which:

FIG. 2 is a top plan view of said vehicle in the process of moving pipe.

FIG. 3 is an enlarged plan view partially in section and partially broken away showing the details of the rollers within the track.

FIG. 4 is an enlarged elevational view partially broken away of the equipment shown in FIG. 3.

FIG. 5 is an enlarged sectional view showing a pipe joint just before it is uncoupled taken on line 5—5 of FIG. 8.

FIG. 6 is an enlarged partial plan view of the rear coupling corner of the vehicle showing the coupling mechanism partially schematically for purposes of illustration.

FIG. 7 is a sectional view showing a pipe joint as it is guided onto the vehicle taken on line 7—7 of FIG. 2 with the latches not shown for purposes of clarity.

FIG. 8 is a perspective view of a portion of the vehicle with the pipe as it would be just before the coupling is unlatched.

Figure 1:
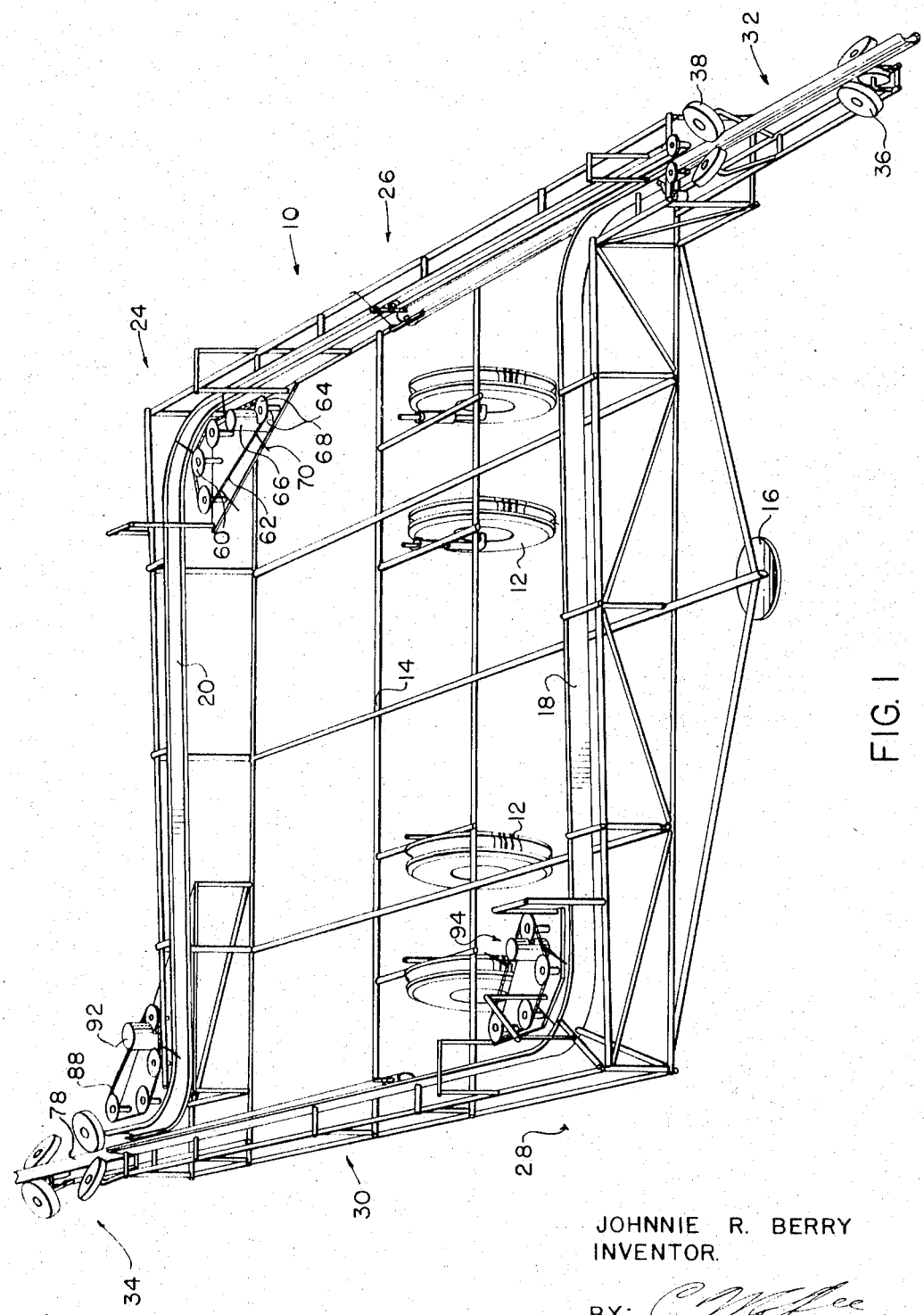
FIG. 1 is a perspective view of a vehicle according to this invention.

As may be seen more particularly in the drawing, vehicle 10 is in the form of a trailer adapted to be pulled by a tractor not shown. In this regard the vehicle 10 has a plurality of wheels 12 connected to frame 14 which has on its forward edge thereof hitch 16 for attachment to the draft vehicle.

Forward track 18 and rear track 20 are supported on the frame 14. The forward and rear tracks 18 and 20 are parallel and the distance between them is slightly less than the length of a joint 22 of the pipe to be moved. The conventional joint of pipe is 30 feet long, therefore the distance between the tracks would be something less than this, for example 28 feet. However, the dimensions for the particular joint of pipe and otherwise are not critical and may be changed by those with skill in the art to adapt it for movement of other lengths of joint. The rear track 20 curves at the rear corner 24 and extends along the lifting side 26. The forward track curves at forward corner 28 and extends along the coupling side 30. The lifting side 26 of the vehicle 10 is aligned with the first position 32 of the line of pipe. The coupling side 30 of the vehicle 10 is aligned with the second position 34 of the pipeline, which is parallel to the first position 32. The vehicle 10 moves to the position 32 between it and position 34.

On the forward edge of the lifting side 26, the tracks 18 and 20 extend out to connect to the pipe as it is lifted. The pipe is lifted by lifting rollers 36 which are attached to the frame 14 of the vehicle 10. These are located forward of the tracks and below them so that if the pipe is once lifted and placed upon the lifting rollers 36 that as the vehicle 10 is advanced that the lifting rollers would advance along the pipe lifting it toward the advancing vehicle. Therefore the lifting rollers 36 are the foremost elements of the vehicle. I have found it desirable to use three lifting rollers, one immediately below the pipe and two on either side thereof at 45°. I have found small pneumatic tires readily available and commercially on the market are well adapted for this. To the rear of the lifting rollers 36 and forward to the commencement of the tracks 18 and 20 are guide rollers 38. They likewise are pneumatic tires and are mounted at 45° angles to operate on the upper quadrant of each of the pipe joints 22 that is guided in. Steady rollers 40 are mounted near the beginning of the tracks 18 and 20 immediately thereabove. They are particularly adapted to steady the pipe so that it does not swing as rollers 42 and 44 engage the tracks. Roller 42 is attached to sprinkler riser 46 and will be engaged first. The roller 42 will fit within the rear track 20 while the roller 44 which is attached to the mock riser 48 will engage and fit within the forward track 18.

The individual joints 22 are coupled together and are held securely together by latches 50. The latches have elongated levers with hook 52 on one end and pivoted about bolt 54 at the center and bars 53 on the end opposite the hook 52. Springs 55 bias the hook 52 inward. Latch rollers 56 are attached to the tracks and are aligned horizontally so that they are aligned with the latches 50. As the coupling joint with the latch 50 moves through the pressure of the latch rollers 56 against the bars 53 moves the hook 52 away from the catches 58.

Thus it may be seen that the mechanism described to this point has provided for lifting the joint of pipe onto the vehicle, threading the rollers 42 and 44 onto the tracks of the vehicle, and unlatching the coupling.

A plurality of guide sprockets 60 are mounted to the frame 14 at the rear corner 24. Chain 62 is trained around the guide sprockets 60. Guide sprocket 64 is connected to an electric motor 66 through a slip clutch 68. The chain 62 has a plurality of spurs 70 extending from it. These spurs extend from the chain 62 below the rear track 20 so that they engage the sprinkler riser 46. One will engage the sprinkler riser 46 at a point shortly before the latches 50 engage the latch roller 56. The speed of the chain 62 is greater than the speed of the joint 22 upon the vehicle 10. Therefore when one of the spurs 70 engages the sprinkler riser 46 it exerts a tension upon the joint 22 tending to uncouple the joint 22 from the pipe line in the first position 32. As the joint advances upon the vehicle and the latch rollers 56 unlatch the joint, an uncoupling tension will withdraw the joint 22 from the pipeline in the first position 32, thus uncoupling it therefrom.

The tracks 18 and 20 slope downward from the lifting side 26 to the coupling side 30. Therefore as soon as the joint 22 has been uncoupled the chain 62 pushes the sprinkler riser 46 around the rear corner 24 while the roller 44 curves around on the forward track 18. At that point one of the spurs 70 disengages the sprinkler riser and the joint transverses the vehicle 10 by gravity.

For proper operation there ordinarily will be a joint 72 upon the vehicle. (This joint has not been shown in FIG. 1 for clarity of illustration.) The joint 72 is adjacent to the coupling side 30 of the vehicle 10. The joint 72 is prevented from rolling downward by gravity by plunger 74 of solenoid 76 attached to the rear track 20 which interrupts the travel of the roller 42 (FIG. 6). There is yet another joint 78 which is being fed from the vehicle 10 in the second position 34 (FIGS. 1, 2, and 6). The line of coupled pipe in the second position 34 is guided from the vehicle by guide rollers 80 which are similar to the lifting and guide rollers 36 and 38 by which the pipe is guided onto the vehicle from the first position 32.

Referring particularly to FIG. 6 as the pipe joint 78 clears the forward track 18 which is extended along this area, the roller 44 within the track 18 will close switch 82. The closing of the switch 82 will cause the solenoid 76 to depress the plunger 74 permitting the joint 72 to be moved. The joint 72 is then brought around the curve 84 in the rear track 20 by the action of spur 86 upon chain 88. The chain 88 is trained around a plurality of sprockets 90 one of which is driven by electric motor 92 through a slip clutch. The spur 86 contacts the riser 46 upon the joint 72 and urges the joint 72 against the plunger 74. Inasmuch as the plunger 74 prevents the joint 72 from moving, the system remains in this position until the previous pipe joint 78 depresses the switch 82 at which time the plunger 74 is withdrawn and the joint 72 is moved. The joint 72 is driven by the chain 88 until the female end next to the riser 46 couples with the pipe joint 78. It will be understood that the axial movement of the joint 72 causes the joints to couple. The forward portion of the hooks 52 form cams so that as one joint is forced over the other that the latches 50 are engaged with the catch 58. Also it will be seen that as soon as the wheel 44 clears the switch 82 that the switch again opens therefore permitting the plunger 74 to block the movement of the next joint of pipe from jamming the operation.

I have found it desirable to include additional chain sprocket arrangement 94 at the corner 28 to cause an even movement of the joint 72 as it comes around. Without it sometimes the joint tends to jam at the corner. The chain in this case is driven by a slip clutch and the purpose of the chain arrangement at 94 is to cause the joint 72 to go around the corner smoothly.

Thus it may be seen in operation that as the vehicle 10 is advanced through the field, the line of pipe in the first position at 32 is picked up and uncoupled and the joints individually moved across the trailer. Aligned with the second position 34 they are recoupled and placed on the ground in a second line which is parallel to the first position 32.

It will be understood that at the beginning of the movement it is necessary not only to pick one joint of pipe up at 22 and feed it into the uncoupling portion of the vehicle at side 26 but it is also necessary to have a second joint 78 of pipe to feed out from the coupling side 30 of the vehicle. However, if the second joint 78 of pipe were not fed out of the coupling portion of the vehicle switch 82 would never be tripped and therefore the plunger 74 would never be released and none of the joints of pipe 72 would ever be released from the tracks on the vehicle 10. If it is desired to pick up all of the pipe and load it on the vehicle without discharging in the second position parallel to the first this is easily accomplished by never tripping the switch 82.

With the trailer full of pipe if it is desired to discharge the pipe at some location when there is none to be picked up, this is easily accomplished by tripping the switch 82 by hand so that the first joint of pipe is discharged in the new position and therefore advancing the vehicle so that additional joints of pipe are discharged as needed.

Electric motors and solenoids have been disclosed. It will be understood that suitable power supply 96 in the form of batteries are provided for these. Of course it will be obvious to one with ordinary skill in the art that hydraulic motors could be used to power the chains and these supplied with hydraulic power from the tractor which tows the vehicle 10.

Referring more particularly to FIGS. 3 and 4 there is illustrated the roller assembly. It will be understood that the assembly found on mock riser 48 is identical with that found on the sprinkler riser 46 except that they operate on opposite sides and therefore for simplicity only the assembly on the sprinkler riser 46 which runs in the rear track 20 is shown in detail.

Trifurcated rocker 100 is pivoted by pin 102 to clamp 104 which surrounds the riser 46. The clamp is securely attached to the riser 46 by clamp bolt 106. The pin 102 fits within ears 108 formed in the clamp 104. The rocker has an arcuate segment cut out leaving shoulders 110 (only one of which shows in full line on the drawing). These shoulders are adapted to rock against projection 112 on the clamp 104 to limit the movement of the rocker 100 about the axis defined by the pin 102. The rocker 100 is urged to the position as seen in FIGS. 3 and 4 by spring 114. One end of the spring rides against clamp 104 while the other is attached as through a hole into rocker 100.

Center branch 116 of the trifurcated rocker 100 forms a spindle upon which the roller 42 is mounted. Roller 42 is the main roller which supports one end of the joint 22. The two end branches 118 each carry vertical spindle 120 thereon. A pilot roller 122 is mounted upon each of the vertical spindles 120.

It will be apparent that the embodiment shown is only exemplary and that various modifications can be made in construction, materials, and arrangement within the scope of the invention as defined in the appended claims.

I claim as my invention:

1. The method of moving coupled agricultural irrigation pipe comprising:
   (a) advancing a vehicle along a line of coupled pipe,
   (b) guiding the line of pipe over rollers on the vehicle thus
   (c) lifting the line of pipe as the vehicle advances,
   (d) uncoupling each joint of the line of pipe after the joint is lifted on the vehicle, and
   (e) moving the uncoupled joints laterally on the vehicle.

2. The method as defined in claim 1 with the additional steps of:
   (f) recoupling the joints of pipe on the vehicle, and
   (g) allowing the line of recoupled pipe to run off the vehicle as the vehicle is moved along.

3. The invention as defined in claim 1 wherein the uncoupling is accomplished by
   (f) guiding the pipe through additional rollers aligned with the latches of each connection and
   (g) exerting uncoupling tension on the joints as the additional rollers open the latches.

4. The method of uncoupling a line of agricultural irrigation pipe, the line of pipe having joints, each joint having a connection on each end, and the connection of adjacent joints being held together with latches; comprising the steps of:
   (a) passing the line of pipe through rollers which are aligned with the latches of each connection, and
   (b) exerting uncoupling tension on the joints as the rollers open the latches.

5. The method of moving coupled agricultural irrigation pipe comprising the steps of:
    (a) lifting a line of coupled pipe onto one side of a vehicle,
    (b) uncoupling each of the joints of the line of pipe after it has been lifted onto the vehicle,
    (c) moving each of the uncoupled joints to the other side of the vehicle,
    (d) recoupling the joints together to form a line,
    (e) lowering the line of recoupled pipe to the ground, and
    (f) advancing the vehicle as the above steps are performed.

6. The invention as defined in claim 5 wherein the joints are uncoupled by
    (g) passing the line of pipe through rollers aligned with latches of each connection and
    (h) exerting uncoupling tension on the joints as the rollers open the latches.

7. In an agricultural irrigation apparatus having
    (a) a plurality of joints of pipe
    (b) coupled together to form a line, and
    (c) a sprinkler riser on each joint adapted to carry a sprinkler thereon;
the improvement for moving said line from a first position to a second parallel position comprising:
    (d) a vehicle,
    (e) means on the vehicle for moving the vehicle parallel to the first position between the first and second position,
    (f) lifting means on one side of the vehicle aligned with said first position for lifting said line of pipe onto said vehicle,
    (g) latches on said pipe joints to hold the pipe coupled together,
    (h) latch rollers on said vehicle adjacent to said lifting means aligned with said latches for opening said latches,
    (j) recoupling means on the other side of the vehicle aligned with said second position for recoupling the pipe, and
    (k) tracks on the vehicle for guiding the pipe from the lifting means to the recoupling means,
    (m) said tracks sloping downward from said lifting means to said recoupling means.

8. The invention as defined in claim 7 with the addition of
    (m) a joint of pipe,
    (n) said joint of pipe having a roller attached adjacent each end thereof,
    (p) said rollers located in said tracks.

9. The invention as defined in claim 7 with the addition of
    (m) said tracks extending at the front, rear, and along each side of the vehicle,
    (n) said tracks curved from the rear to along one side and from the front to along the other side,
    (p) a chain at each of said curves,
    (q) projections on the chain extending over the track to contact a riser extending upward from the pipe as said pipe is being guided in said tracks, and
    (r) means for driving said chain.

10. In an agricultural irrigation apparatus having
    (a) a plurality of joints of pipe
    (b) coupled together to form a line, and
    (c) a sprinkler riser on each joint adapted to carry a sprinkler thereon,
the improvement for moving said line from a first position to a second parallel position comprising:
    (d) a vehicle,
    (e) means on the vehicle for moving the vehicle parallel to the first position between the first and second position,
    (f) transverse tracks on the vehicle for guiding the pipe from one side of the vehicle to the other,
    (g) means on one side of the vehicle aligned with said first position for uncoupling said joints of pipe,
    (h) recoupling means on the other side of the vehicle aligned with second position for recoupling the pipe,
    (k) said tracks sloping downward from said means for uncoupling to said recoupling means, and
    (m) guide means on said vehicle aligned with said first position for guiding said pipe upward into said means for uncoupling.

11. In an agricultural irrigation apparatus in the form of a joint of pipe adapted to be moved by a special means, said joint having
    (a) a male coupling on one end of said joint,
    (b) a female coupling on the other end of said joint so that said joint may be coupled to similar joints on each end to form a line, and
    (c) a sprinkler riser attached vertically adjacent one end of said joint adapted to carry a sprinkler thereon;
the improvement comprising:
    (d) a mock riser vertically attached adjacent the other end of said joint,
    (e) a horizontal spindle for each riser,
    (f) means attaching each spindle for pivoting about a vertical axis to its riser, and
    (g) a roller on each spindle adapted to travel in a track on said special means.

References Cited

UNITED STATES PATENTS

| | | | |
|---|---|---|---|
| Re. 24,976 | 5/1961 | Goesch | 214—1 |
| 1,943,496 | 1/1934 | Thompson | 285—5 |
| 2,780,376 | 2/1957 | Sanders | 214—519 |
| 2,860,008 | 11/1958 | Jacoby | 137—344 |
| 3,195,563 | 7/1965 | Race | 137—343 |

THOMAS H. EAGER, *Primary Examiner.*